April 26, 1949.　　J. P. CROWLEY　　2,468,178
CUTTING MACHINE
Filed Dec. 12, 1942　　3 Sheets-Sheet 2
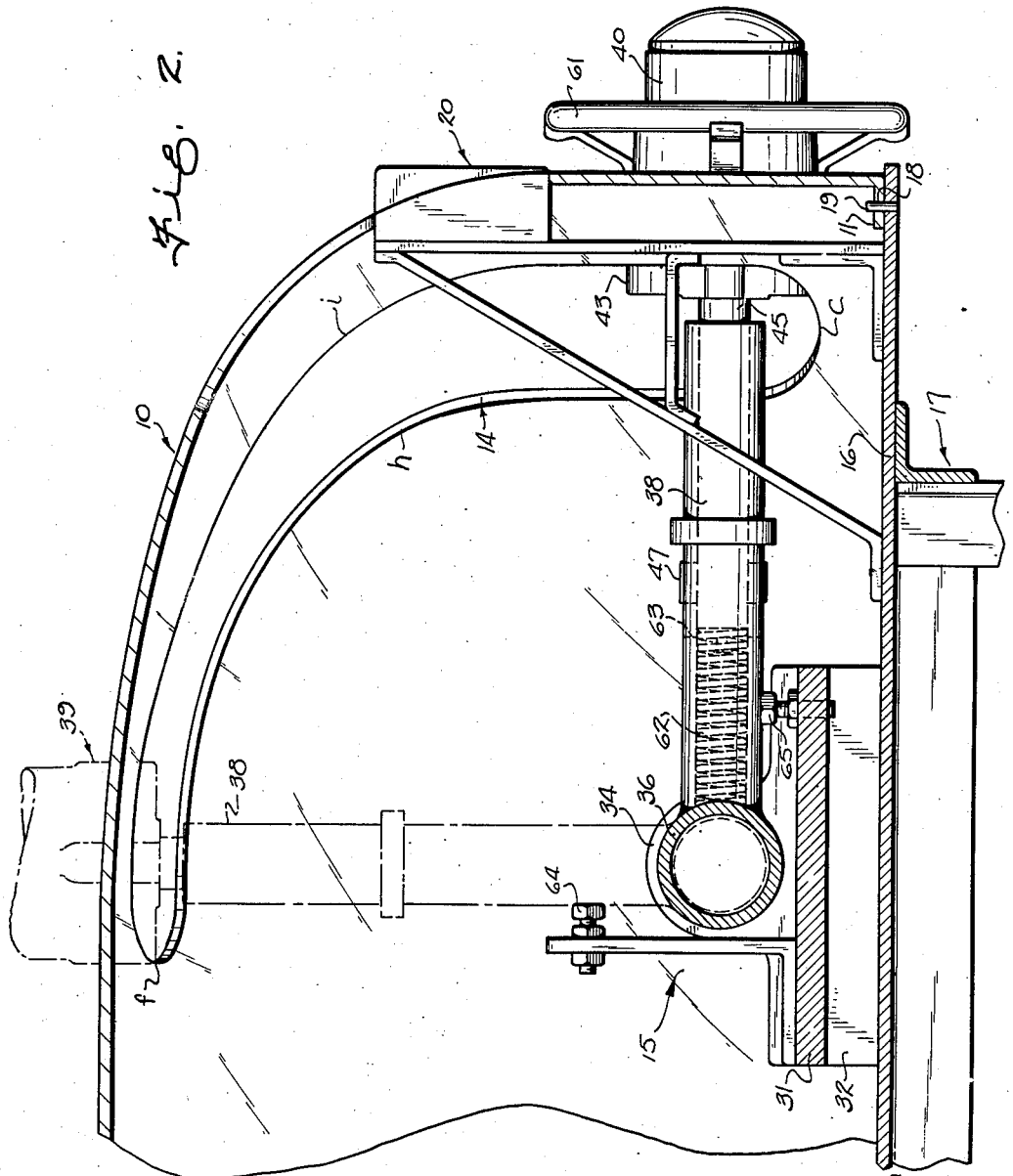
Inventor
JOSEPH P. CROWLEY,
By
Frank Fraser
Attorney April 26, 1949.　　　　J. P. CROWLEY　　　　2,468,178
CUTTING MACHINE
Filed Dec. 12, 1942　　　　　　　　　　　3 Sheets-Sheet 3
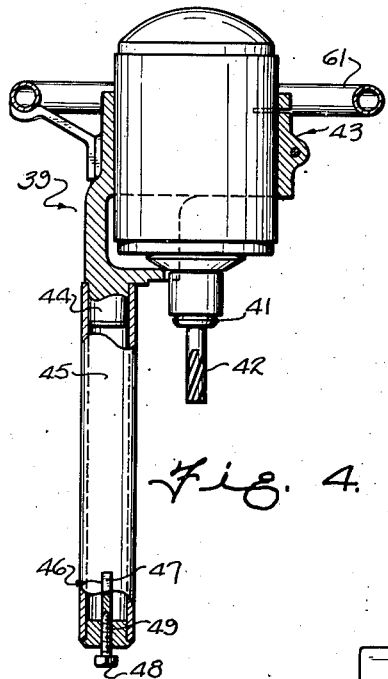
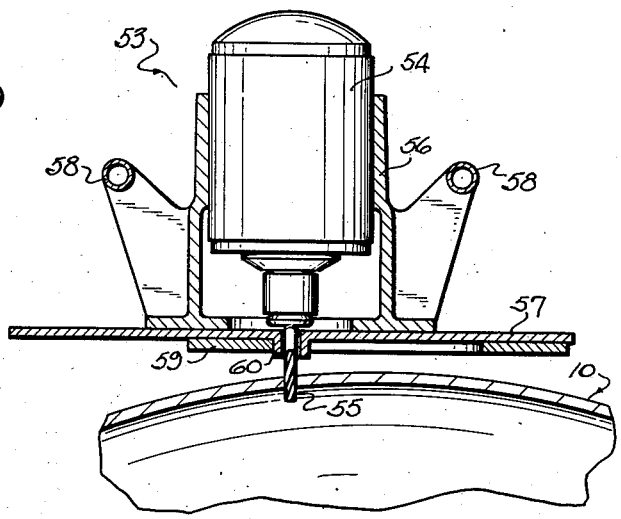
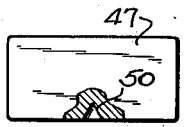
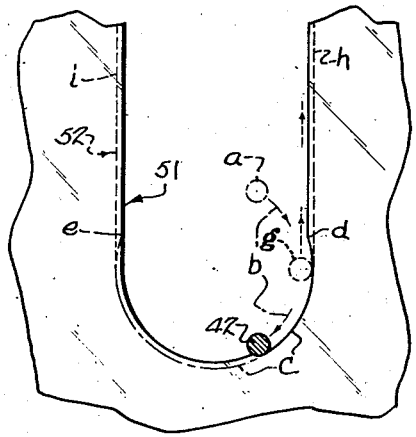
Inventor
JOSEPH P. CROWLEY,
By
Frank Fraser
Attorney Patented Apr. 26, 1949

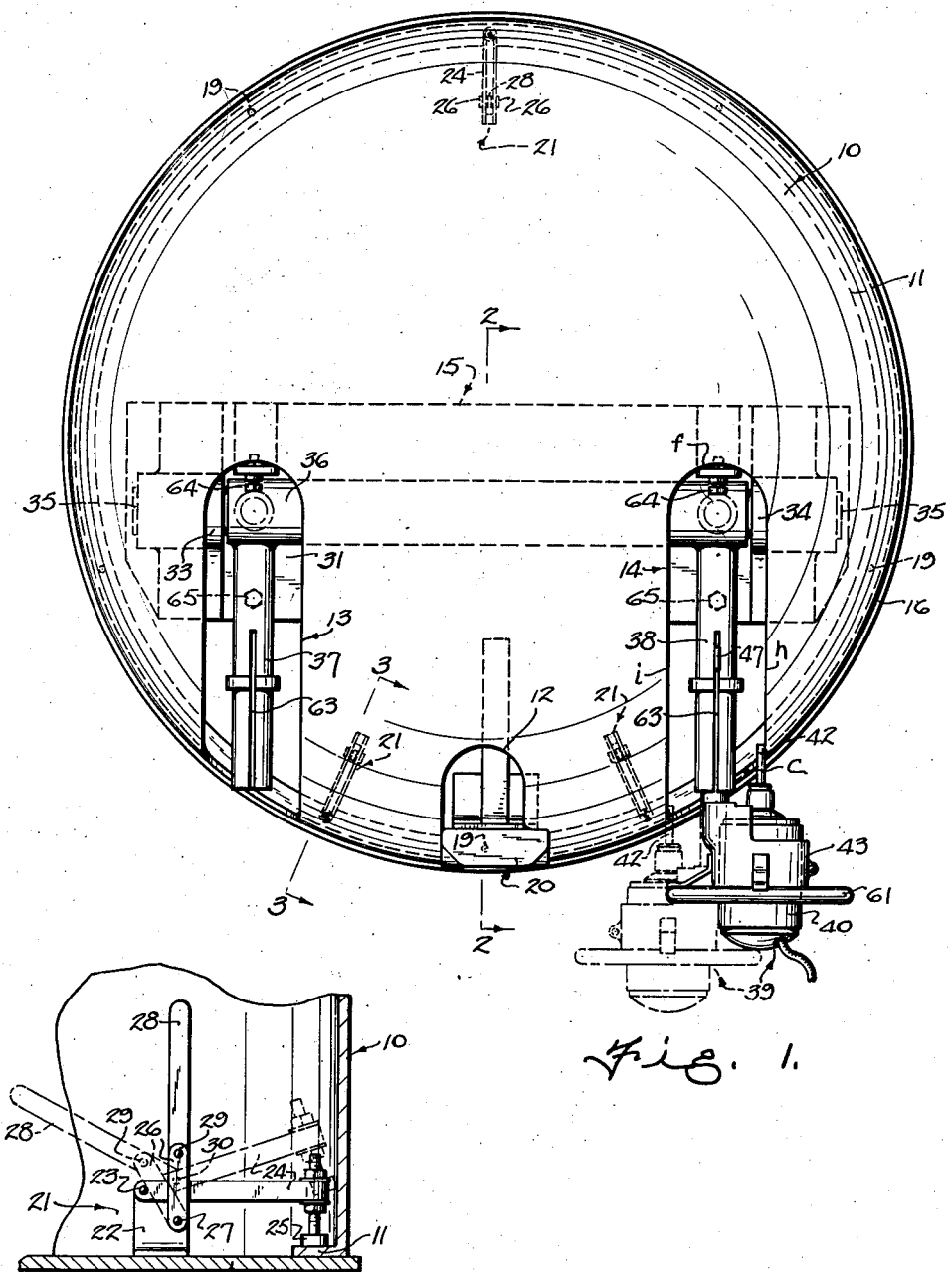

2,468,178

UNITED STATES PATENT OFFICE 2,468,178

CUTTING MACHINE

Joseph P. Crowley, Toledo, Ohio, assignor to Libbey-Owens-Ford Glass Company, Toledo, Ohio, a corporation of Ohio Application December 12, 1942, Serial No. 468,827

7 Claims. (Cl. 90—12)

The present invention relates to cutting and finishing machines generally and more particularly to a novel type of mounting for supporting and guiding a cutting or routing tool during cutting movement.

Although not restricted to such use, the apparatus of this invention is particularly adapted for cutting openings of predetermined shape and size in curved or bent work pieces, such as, for example, for the cutting of gun slots or other openings in aircraft firing turrets. Generally speaking, airplane turrets must be transparent and so designed as to afford a wide range of vision for the gunner. For this reason most of the turrets now being produced are made of clear plastic material, such as the methyl methacrylate resins of the type made under the trade-names "Plexiglas" and "Lucite." Transparent sheets of methyl methacrylate plastic, when bent or shaped into substantially dome form by the action of heat and pressure, have been found to be well suited for this purpose, being relatively light in weight and having satisfactory optical properties.

It is an object of the invention to provide apparatus for cutting openings or slots of predetermined shape and size in work of the above character rapidly, accurately and economically.

Another object is the provision of means for supporting and guiding a cutting or routing tool during cutting movement in a manner to produce a plurality of clean, spaced, parallel cuts in curved or rounded work pieces.

A further object is the provision of apparatus for supporting and guiding a cutting or routing tool during cutting movement in a manner to produce slots having parallel sides and rounded ends in substantially dome shaped work pieces.

Another object is the provision of apparatus for supporting and guiding a cutting or routing tool during cutting movement along an arcuate path and for controlling the lateral movement of the tool while allowing free radial movement thereof.

Another object is the provision of a routing apparatus for truing up and smoothing off a rough cut in substantially dome shaped work pieces to produce openings therein of accurate, predetermined shape and dimensions.

Still another object is the provision of means for positioning and securely holding dome shaped work pieces on a work support during the cutting operation.

Other objects and advantages of the invention will become more apparent during the course of the following description, when taken in connection with the accompanying drawings.

In the drawings, wherein like numerals are employed to designate like parts throughout the same:

Fig. 1 is a plan view of a turret mounted on a supporting table with the cutting apparatus of the invention in operative position;

Fig. 2 is a vertical section taken substantially on the line 2—2 in Fig. 1;

Fig. 3 is a fragmentary vertical section taken on the line 3—3 in Fig. 1;

Fig. 4 is a side view, partially in section, of the portable router or cutting unit and associated parts;

Fig. 5 is a detail of the key used in preventing swinging movement of the tool during one part of its cutting travel;

Fig. 6 is a side view, partially in section, of a unit used for making a preliminary or rough cut; and Fig. 7 is a diagrammatic view showing the path of travel of the routing tool during the cutting operation.

Referring now more particularly to the drawings, there is illustrated in Figs. 1 and 2 a dome shaped plastic turret 10 provided with an inturned annular flange 11. The flange 11 is formed during the shaping or bending of the sheet of resin plastic and may be removed before the finished turret is installed in an airplane. In the meantime, however, it is useful in locating and clamping the turret in position for cutting the necessary openings therein.

It is desired that a turret of the type illustrated in the drawings be provided with a camera slot 12 and two gun slots 13 and 14 on either side of the camera slot. It will be apparent that all three of these openings should face in the same direction and, in addition, the gun slots must be parallel with one another and provided with straight parallel sides to provide free movement and maximum clearance for the guns when mounted within the turret. The embodiment of the invention here illustrated has been especially designed for accurately and expeditiously cutting out the gun slots 13 and 14, but it will be obvious as the description progresses that similar apparatus could also be used for cutting out the camera slot 12 or any other necessary or desired openings in the turret 10. Further, a suitable abrasive tool might be substituted for the cutting or routing tool for smoothing or polishing the cut edges of the work.

The routing machine of the invention is designated in its entirety by the numeral 15 and is preferably mounted on a flat, horizontal table top 16 supported on a suitable framework 17. The turret 10 to be cut is placed over the routing machine 15 with its flange 11 resting on the top of the table 16. In order to insure accurate cutting of the gun slots, the turret must be properly positioned upon the table, and to this end a plurality of spaced holes 18 are drilled in the flange 11 and are adapted to fit over locating pins 19 extending upward from the top of the table 16. In cases where the camera slot 12 has been previously cut out, there may be mounted on the table 16 a locating bracket 20 which is adapted to fit into the camera slot and further assist in positioning the turret.

With the turret properly located on the table 16, it is then desirable to hold it securely in place to prevent shifting of the work during the cutting operation. For this purpose, there is provided, as shown in Fig. 3, a plurality of clamps 21, each including a base 22, mounted on the table 16. Pivoted at one end to the base 22 as at 23 is an arm 24 carrying at its opposite end a resilient clamping member 25 adapted to engage the flange 11 of the turret 10. The arm 24 passes between a pair of plates 26 pivoted to the base as at 27 and these plates also have pivotal connection with a handle 28 as at 29, while the handle 28 has a second pivotal connection with the arm 24 at 30.

With this arrangement, it will be seen that when the handle 28 is moved back into broken line position (Fig. 3) the clamping member 25 will be lifted off of the flange 11 to release the turret, but when the handle 28 is moved forward into full line position the clamping member 25 will be forced downwardly onto the flange 11 to clamp it firmly onto the table 16.

The portion of the routing machine 15 which is located within the turret comprises a horizontal plate or platform 31 mounted above the table 16 on suitable blocks 32 and carries, adjacent its opposite ends, a pair of bearings 33 and 34 within which are journaled the reduced end portions 35 of a horizontally arranged, hollow shaft 36. Welded to the shaft 36 are a pair of spaced, radially extending tubular members or arms 37 and 38 positioned in alignment with the longitudinal center lines of slots 13 and 14 respectively, which it is intended to cut from the turret 10.

The actual cutting unit of the routing machine 15 is a portable one, being designated in its entirety by the numeral 39 (Fig. 4) and includes a motor 40 having a chuck 41 at the end of its drive shaft and within which is mounted a routing tool 42. The motor 40 is clamped within a bracket 43 provided at one side thereof with a downwardly extending stub shaft 44 which is received and tightly held within the upper end of a tubular shaft 45 extending downwardly past and parallel with the routing tool 42 and adapted to telescope within either one of the tubular arms 37 or 38. The shaft 45 is slotted as at 46 to receive a key 47 adapted to be retained within the shaft by means of a set screw 48 threaded through the plug 49 in the end of the shaft 45 and provided with a pointed end to fit within a recess 50 in the key 47.

In cutting openings such as the gun slots 13 and 14 in a substantially hemispherical work piece such as the dome shaped turret 10, it is necessary to first make a preliminary cut in the work, which cut should roughly approximate the shape desired in the finished opening. This rough cut permits the cutting unit 39 to be operated from outside the turret 10 while being operatively connected to the portion of the machine 15 that is located within the turret (see Figs. 1 and 2). According to the preferred method a rough or preliminary cut 51 (Fig. 7) is made which is within ⅛ inch on all sides of the dimensions desired in the finished gun slot 52. The preliminary cut can be made in any desired manner before placing the turret on the table 16 and in Fig. 6 there has been indicated diagrammatically one way in which this may be accomplished. As here shown, there is provided a routing unit 53 including a motor 54 driving a rotatable cutting tool 55 and clamped within a bracket 56 mounted on a plate 57 and provided with handles 58.

The turret 10 is suitably secured in proper position beneath a template 59 of the size and shape desired. The operator, grasping the handles 58, then places the routing unit 53 in the position shown in Fig. 6, forcing the rapidly rotating tool 55 through the plastic material of the turret. By moving the unit 53 in the direction of cut and with the boss 60 of the plate 57 in contact with the inner edge of the template 59, an opening 51 (Fig. 7) of approximately the contour desired will be cut in the turret 10.

After the gun slots have been roughly cut out from the turret 10, the turret is located on the table 16 and clamped securely in place as described above, at which time it is ready for the final or finish cut to be made. To this end, the operator, after first removing the key 47 from the shaft 45, lifts the cutting unit 39 by its circular handle 61 and inserts the shaft 45 through the rough opening 51 in the turret 10 and into one of the tubular arms 37 or 38, for example arm 38 as shown in full lines in Figs. 1 and 2, forcing the shaft inwardly against the action of a compression spring 62 which is positioned within each of the arms.

At this time, the tool 42 should be in position a (Fig. 7) and because the key 47 has been removed the unit 39 is free to swing about the arm 38 as a pivot. The operator then swings the unit to cause the tool 42, rapidly rotated by the motor 40, to move in a circular path indicated by the arrows b and make a clean accurate cut c extending from point d to point e. By reference to Fig. 1, it will be noted that in making the lower semi-circular cut c the unit 39, in addition to moving in a circular path, must also move outwardly in passing from the full to the broken line position, and this is accomplished by simply permitting the compression spring 62 to gradually force the unit outwardly against the pressure exerted by the operator as he swings the unit through its circular cutting stroke. Upon completion of the cut c the unit 39 and the arm 38 are swung upwardly into the broken line position (Fig. 2) and the operation just described is repeated to make the upper semi-circular cut f.

The arm 38 is then returned to its lower or full line position and the unit 39 removed to permit the key 47 to be secured in place in the shaft 45, after which the shaft is reinserted into the arm 38 with the key 47 sliding in the slot 63 (Figs. 1 and 2). At this time, the cutting tool 42 will be in position g (Fig. 7) and circular movement of the unit 39 will be prevented by the key 47. The operator will then move the cutting unit from full to broken line position (Fig. 2) to make the longitudinal cut h (Fig. 7), after which the unit 39 will be removed from the arm 38, turned through 180°, the shaft 45 reinserted in the arm with the key 47 reversed in the slot 63 (broken lines Fig. 1), and the same operation performed to make the opposite longitudinal cut i.

It will be seen that the width of the slot cut by the routing machine 15 and the radius of the opposite end cuts will be determined by the distance between the center lines of the shaft 45 and the cutting tool 42 and also by the diameter of the cutting tool. Further, since the angle of the tool 42 during the cutting operation is determined by the position of the pivoted arms 37 and 38, the adjacent sides of the finished cut will always be substantially parallel with the barrel of the gun which is mounted to extend therethrough. Although the router has been shown as cutting through only a single thickness of plastic, reinforcing sheets or ribs may be adhered to the inside of the turret and the multiple thickness of plastic trued up or cut out in the same manner as the single thickness to give a clean, smooth, finish cut.

As indicated above, during the cutting operation the operator will be pressing the cutting unit 39 radially inward against the action of the compression spring 62 to maintain the tool 42 in proper cutting position relative to the work. Thus, as shown in full lines in Fig. 1, the cutting unit 39 will be pressed to near its limit of inward movement while making the longitudinal cut h. However, in making the cut i it is necessary to permit the unit to move a considerable distance outward as shown by the broken lines in Fig. 1. This free radial movement is also of advantage in accommodating the tool to the cutting of curved work pieces which are not formed or bent on a true radius. Adjustable stops 64 and 65 are provided to control the length of the longitudinal cuts h and i and also act to locate the arms 37 and 38 during the routing of the semi-circular cuts c and f.

The gun slot 13 will of course be cut in the same manner as slot 14 and the two will be uniform in size, shape and relative position. Also, the routing machine 15 will reproduce both of these gun slots exactly in each subsequent turret of the same contour when properly positioned on the table 16.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. Apparatus for cutting curved work pieces, comprising a support for the work, a member mounted for swinging movement above said support and in a plane at an angle thereto, and a cutting unit pivotally associated with said swingable member and including a rotatable cutting tool having a cylindrical cutting face parallel with said swinging member and engageable with the work piece and mounted for travel around said swingable member to cut circular openings in said work piece.

2. Apparatus for cutting curved work pieces, comprising a support for the work, a member mounted for swinging movement above said support and in a plane at an angle thereto, and a cutting unit pivotally associated with said swingable member and including a rotatable cutting tool having a cylindrical cutting face parallel with said swinging member and engageable with the work piece, said unit being mounted for travel around said swingable member in a circular path and also being movable with said member to travel along an arcuate path during the cutting operation.

3. Apparatus for cutting curved work pieces, comprising a support for the work, a member mounted for swinging movement above said support, and a cutting unit pivotally and slidably associated with said swingable member about and upon an axis coincident with the radius of said swinging movement and including a rotatable cutting tool having a cylindrical cutting face parallel with said swinging member and engageable with the work piece and adapted to travel around said swingable member and also freely movable in said radial direction relative to said member to cut circular openings in said curved work piece.

4. Apparatus for cutting curved work pieces, comprising a support for the work, a member mounted for swinging movement above said support, and a cutting unit pivotally and slidably associated with said swingable member and including a cutting tool engageable with the work piece, said unit being adapted to travel around said swingable member in a circular path and also being movable with said member to travel along an arcuate path, and means for preventing movement of said unit in a circular path during said arcuate movement thereof without interfering with free radial movement of said unit.

5. Apparatus for cutting curved work pieces, comprising a support for the work, a tubular member having a keyway and mounted for swinging movement above said support, a cutting unit associated with said member and including a shaft slidable within the tubular member and a cutting tool offset from said shaft and parallel therewith, said cutting unit being movable in a circular path around said member as a center and also movable with said member through an arcuate path, and a key removably associated with said shaft and slidable in the keyway in said tubular member for preventing circular movement of said cutting unit during said arcuate movement thereof without affecting relative sliding movement between said unit and said member.

6. Apparatus for cutting curved work pieces, comprising a support for the work, a tubular member having a keyway and mounted for swinging movement above said support, a cutting unit associated with said member and including a shaft slidable within the tubular member and a cutting tool offset from said shaft and parallel therewith, said cutting unit being movable in a circular path around said member as a center and also movable with said member through an arcuate path, a key removably associated with said shaft and slidable in the keyway in said tubular member for preventing circular movement of said cutting unit during said arcuate movement thereof without affecting relative sliding movement between said unit and said member, and resilient means for urging said unit outwardly from said member and away from said work.

7. Apparatus for cutting curved work pieces, comprising a support for the work, a tubular member having a keyway and mounted for swinging movement above said support, a cutting unit associated with said member and including a shaft slidable within the tubular member and a cutting tool offset from said shaft and parallel therewith, said cutting unit being movable in a circular path around said member as a center and also movable with said member through an arcuate path, stop means for determining the extent of said arcuate movement and for positioning said cutting unit during said circular movement, and a key removably associated with said shaft and slidable in the keyway in said tubular member for preventing circular movement of said cutting unit during said arcuate movement thereof without affecting relative sliding movement between said unit and said member.

JOSEPH P. CROWLEY.

REFERENCES CITED

The following references are of record in the file of this patent:

UNITED STATES PATENTS

| Number | Name | Date |
| --- | --- | --- |
| 589,003 | Luther | Aug. 31, 1897 |
| 910,315 | Riddell | Jan. 19, 1909 |
| 1,396,993 | Carter | Nov. 15, 1921 |
| 1,434,440 | Knudsen | Nov. 7, 1922 |
| 1,569,490 | Hiscock | Jan. 12, 1926 |
| 1,628,845 | Jackson | May 17, 1927 |
| 1,723,106 | Wiglenda | Aug. 6, 1929 |
| 1,748,591 | Uschmann | Feb. 25, 1930 |
| 2,340,210 | Armitage et al. | Jan. 25, 1944 |

FOREIGN PATENTS

| Number | Country | Date |
| --- | --- | --- |
| 20,558 | Switzerland | Oct. 11, 1899 |
| 663,375 | France | Apr. 8, 1929 |